US010401874B1

(12) United States Patent
Acknin et al.

(10) Patent No.: US 10,401,874 B1
(45) Date of Patent: Sep. 3, 2019

(54) AUTONOMOUS AIRCRAFT NAVIGATION (71) Applicant: Skyways Air Transportation Inc, Manor, TX (US)

(72) Inventors: Charles Acknin, Manor, TX (US); Jonathan Plinio Muller, Manor, TX (US)

(73) Assignee: Skyways Air Transportation Inc, Manor, TX (US)

( * ) Notice: Subject to any disclaimer, the term of this patent is extended or adjusted under 35 U.S.C. 154(b) by 0 days.

(21) Appl. No.: 16/186,528

(22) Filed: Nov. 10, 2018

(51) Int. Cl.
*G05D 1/12* (2006.01)
*G05D 1/10* (2006.01)
*B64C 39/02* (2006.01)
*G06T 7/70* (2017.01)
*B64D 1/22* (2006.01)
*G05D 1/00* (2006.01)

(52) U.S. Cl.
CPC ............. *G05D 1/12* (2013.01); *B64C 39/024* (2013.01); *B64D 1/22* (2013.01); *G05D 1/0088* (2013.01); *G05D 1/101* (2013.01); *G06T 7/70* (2017.01); *B64C 2201/128* (2013.01); *B64C 2201/141* (2013.01); *G06T 2207/10048* (2013.01); *G06T 2207/30252* (2013.01)

(58) Field of Classification Search
None
See application file for complete search history.

(56) References Cited

U.S. PATENT DOCUMENTS

| 9,549,101 | B1 * | 1/2017 | Brain | H04N 5/33 |
| 2017/0313421 | A1 * | 11/2017 | Gil | H04W 4/70 |
| 2018/0130008 | A1 * | 5/2018 | Liu | G06Q 10/083 |
| 2018/0218248 | A1 * | 8/2018 | Haas | G06F 3/011 |
| 2018/0338120 | A1 * | 11/2018 | Lemberger | H04N 7/186 |

* cited by examiner

*Primary Examiner* — Jonathan M Dager
*Assistant Examiner* — Garrett F Evans
(74) *Attorney, Agent, or Firm* — Cognition IP, P.C.; Bryant Lee (57) ABSTRACT

Systems and methods for autonomous aircraft navigation are disclosed. Embodiments relate to autonomously navigating an aircraft to a payload by locating a payload target attached to the payload. In some embodiments, the payload target is comprised of a plurality of concentric shapes of retroreflective material. These retroreflective shapes may be quickly identified in images to locate the payload. The retroreflective shapes may be illuminated by a light source on the aircraft so that the payload and the payload target do not requires a power source of their own. Some embodiments use band-filtered light and image acquisition techniques to facilitate locating of the payload target.

16 Claims, 7 Drawing Sheets

AUTONOMOUS AIRCRAFT NAVIGATION

FIELD OF INVENTION

The present disclosure relates to autonomous aircraft navigation and more particularly to systems and methods for autonomously navigating an aircraft to a target.

BACKGROUND

The background description provided here is for the purpose of generally presenting the context of the disclosure.

Unmanned Aerial Vehicles (UAVS) may be used to transport cargo or other payloads from one location to another. For example, delivery of packages by UAV or drone aircraft is one application. Some known methods of navigating a UAV to a particular destination may use Global Navigation Satellite System (GNSS) information such as Global Positioning Satellite (GPS) coordinates. However, GPS coordinates are typically not accurate enough to guide an aircraft to a particular point to interact with a payload or cargo. For example, GPS may have an accuracy of approximately 16 feet under typical operating conditions. Therefore, using GPS alone may land an aircraft up to 16 feet away from a payload to be picked up, or may result in dropping off a piece of cargo up to 16 feet away from its intended target.

Due to this uncertainty in location information, loading and unloading small autonomous aircraft may need to be done manually. That is, the aircraft may land at an approximate location and then the cargo is manually loaded or unloaded by hand. Some autonomous systems for loading and unloading aircraft are known but rely on extensive ground support infrastructure and may require power sources to power active components on the ground. These approaches may be acceptable for scenarios involving transporting cargo from one known location to another known location but do not adapt to scenarios where destinations are unknown ahead of time and lack ground support infrastructure.

SUMMARY

Systems and methods are disclosed for autonomous aircraft navigation. Specifically, embodiments disclosed herein provide for autonomously navigating an aircraft to a target site and autonomously loading or unloading a payload at the target site without requiring pre-installed ground support infrastructure. Embodiments discussed below do not require any active components at the target site to facilitate payload pickup and delivery to precise locations.

In an embodiment, an unmanned aerial vehicle (UAV) navigation system is described. The system includes a UAV having a camera and a passive payload target. The UAV may use the camera and an illumination system to visually locate the payload target with high accuracy. Then, the UAV may navigate to the payload target, land on it, and acquire or deposit a payload at the payload target site. In some embodiments, the UAV also includes an illumination system that may illuminate the reflective system of the payload target with a narrow band of light that provides high contrast with the payload target's surroundings. This high contrast imaging may facilitate efficient high-speed and low-error locating of the payload target. In an embodiment, the narrow band of light may be in the infrared spectrum, for example. The payload target may be comprised of retroreflective materials which reflect the incident light from the illumination source aboard the UAV back to the UAV where it is imaged by a camera on the UAV.

In an embodiment, the payload target includes a series of concentric geometric shapes that are readily identifiable in images acquired by the UAV. For example, the payload target may comprise several concentric square shapes made of a retroreflective material. The varying sizes of shapes allows the payload target to be identified both at a distance and up close, so that the target may guide a UAV in to a highly accurate landing from a distant starting point.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
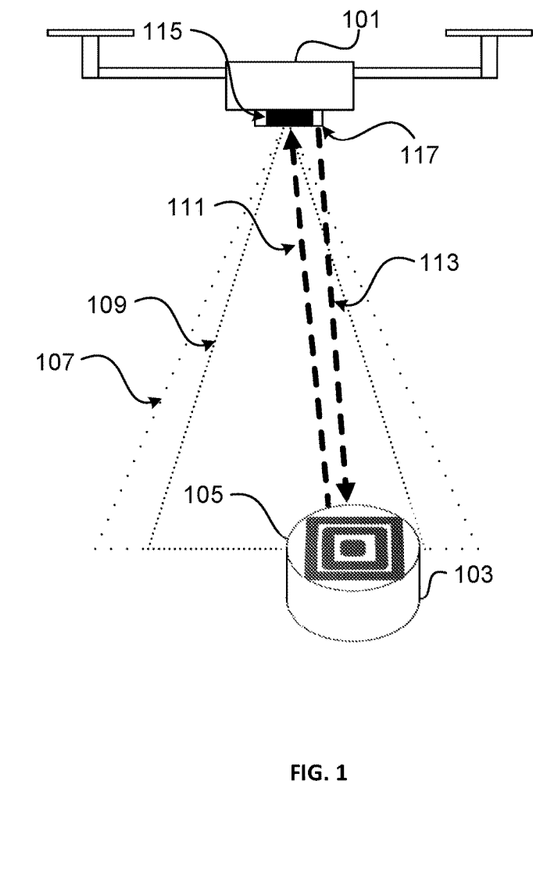
FIG. 1 illustrates a system for navigating an unmanned aerial vehicle (UAV) to a payload according to an embodiment.

FIG. 1 illustrates a system for navigating an unmanned aerial vehicle (UAV) to a payload according to an embodiment. UAV 101 may be an unmanned vertical takeoff and landing (VTOL) aircraft such as a helicopter or so called 'quad-copter' design. UAV 101 is configured and equipped to locate and land on payload target 105 in order to, for example, pick up payload 103. Payload 103 has a payload target 105 affixed to a top side of the payload. The payload target 105 includes an arrangement of passive materials and components configured to be highly visible to UAV 101 which includes a vision system 115 and illumination system 117 on its underside to acquire images of the payload target 105. UAV 101 may then locate the payload target 105 in these images to determine a navigational route to the payload target.

In FIG. 1, vision system 115 system images an area underneath UAV 101, illustrated as imaged area 107. Illumination system 117 illuminates an area underneath UAV 101, illustrated as illuminated area 109. The imaged area 107 is illustrated as being larger than the illuminated area 109 for illustrative purposes only. In some embodiments, the imaged area 107 may be smaller than the illuminated area 109, or the two areas may be substantially equal. Light 113 from illumination system 117 illuminates the payload target 105 and reflected light 111 is reflected from the payload target and imaged by vision system 115.

In some embodiments, illumination system 117 and vision system 115 may be configured to operate in an infrared light band. For example, illumination system 117 may include a plurality of infrared light sources arranged and positioned to illuminate area 109, and vision system may include an infrared camera to acquire and image of area 107. In an embodiment, the infrared light band may be selected to produce a maximum contrast in acquired images. That is, the infrared light band may be selected to be outside the band of light sources expected to the encountered in use such as sunlight. As an example, the infrared light band may be substantially centered on a wavelength of approximately 950 nm. The intensity of sunlight at and around that band of light is comparatively low compared to the visible spectrum or lower part of the infrared spectrum, and thus the combined illumination and vision systems 115, 117 may be able to produce relatively high contrast images of the payload target even in direct sunlight.

This band-limited lighting and imaging serves to act as a kind of imaging filter to enhance the contrast of the payload target image. Furthermore, using light outside of the visible spectrum renders the illumination from the UAV not visible to the unaided eye which may be useful in certain applications such as night time operation or stealth operation. Some embodiments may use light in other bands of wavelength as well but may further employ image filtering to isolate and enhance the image of the payload target. For example, an embodiment may use light in the visible spectrum.

Figure 2A:
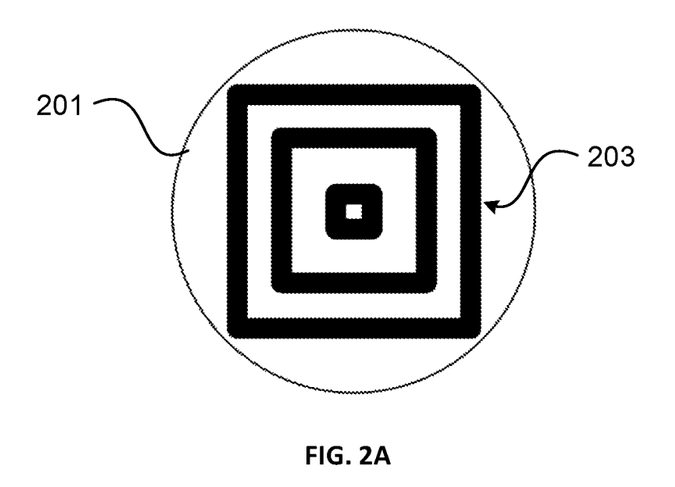
FIGS. 2A-B illustrate payload targets according to various embodiment.

FIG. 2A illustrates a payload target according to an embodiment. In this example, payload target 203 is located on a top side of a payload 201. Payload target 203 includes three concentric squares. The squares are made of retroreflective material and set against a substantially non-reflective background on the top of payload 201.

The retroreflective material of the payload target reflects light back along a vector that is parallel to but opposite in direction from the source that is emitting light and its vector of incidence. In an example, the retroreflective material is comprised of retroreflective glass beads, microprisms, or encapsulated lenses sealed onto a fabric or plastic substrate. The substantially non-reflective background may be, for example, dark felt material, matte black paint, or any similar surface that substantially does not reflect any light. The difference between the retroreflective material and the non-reflective background creates a high-contrast outline of the payload target design which is readily located in images.

Figure 2B:
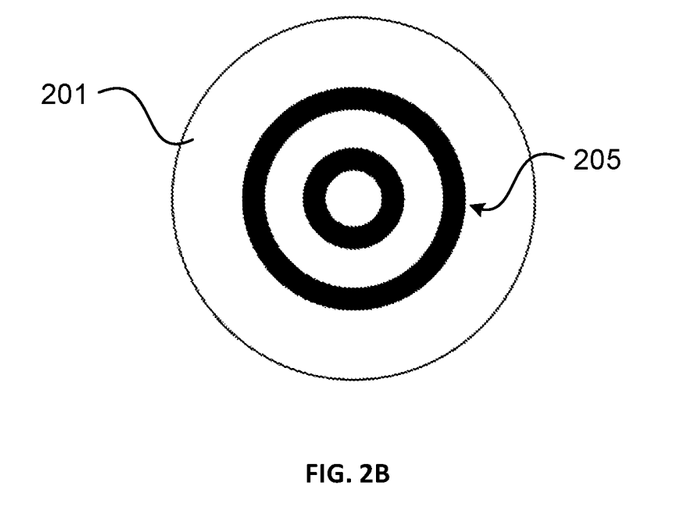

FIG. 2B illustrates an alternative payload target according to an embodiment. In this example, payload target 205 is located on a top side of payload 201. Payload target 205 includes two concentric circles made of a retroreflective material and set against a substantially non-reflective background on the top of payload 201. Other embodiments of payload targets may comprise other geometric shapes, such as but not limited to star shapes, triangles, hexagons, or any other such readily-identifiable or recognizable geometric shapes. Similarly, payload targets may include any number of concentric shapes.

Shapes of a payload target may extend beyond the boundaries of a payload. For example, if a payload target is located on a payload, an additional larger square shape of retroreflective material may be positioned on the ground beneath the payload to provide an even larger target for a UAV to locate. When an image is taken of the payload target from a distance, the larger square shapes may be more readily identifiable because they are physically larger and reflect more light than a smaller shape. As an approaching UAV takes successive images at closer distances to the center of a payload target, the field of view of a camera of the UAV may be smaller than the largest shapes of a payload target. That is, as an approaching vehicle gets close to the payload target, it may not be able to see the outer-most shapes of the payload target. The approaching vehicle is still able to locate the center of the payload target as long as it can image at least one of the shapes of the payload target. This property of the payload target configuration allows for accurate identification from a distance as well as very close so that an approaching vehicle may accurately locate and land at the center of the payload target.

Similarly, larger shapes may be made of wider material than smaller shapes. For example, an outer square shape may be made of retroreflective material one foot wide, while a smallest square shape of the same payload target may be made of retroreflective material of one inch wide. Any number of any combination of squares having any dimensions and any width may be combined to make a payload target.

Figure 3:
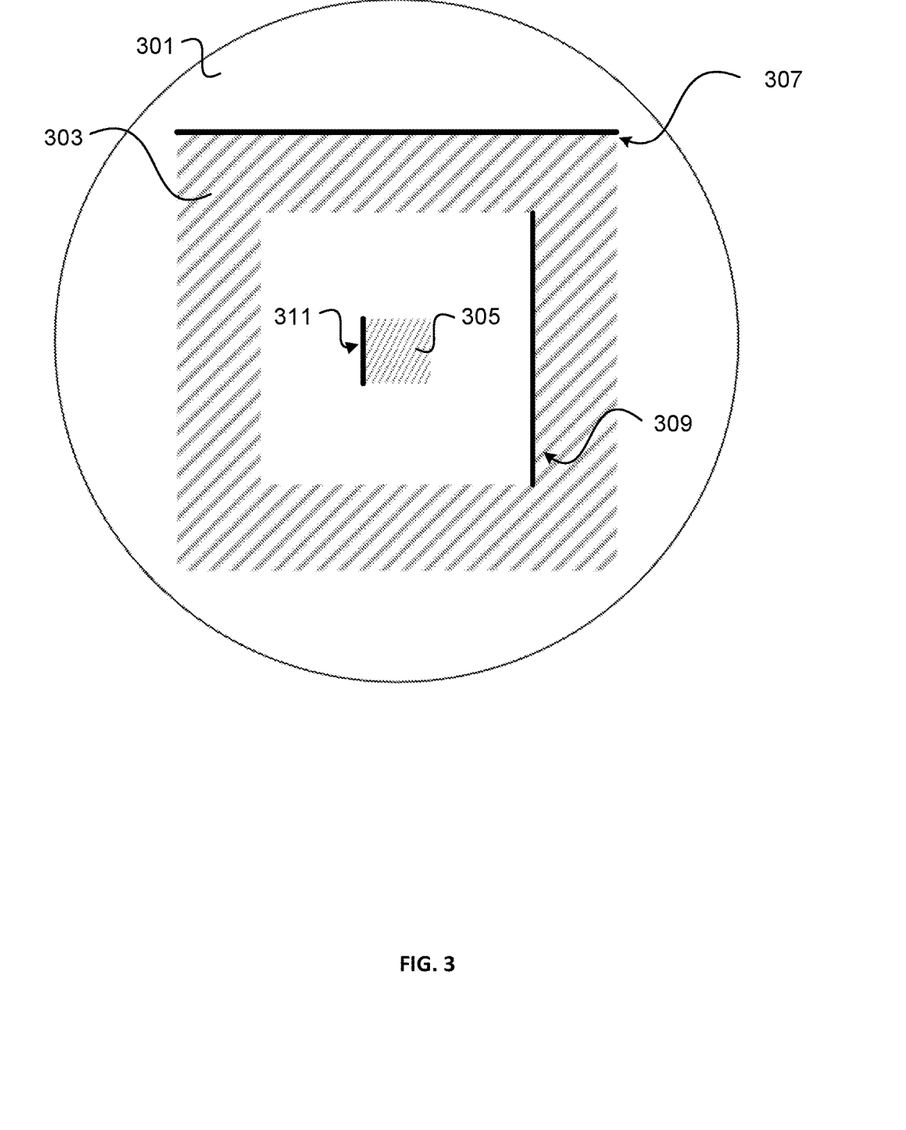
FIG. 3 illustrates features of an example payload target according to an embodiment.

FIG. 3 illustrates features of an example payload target according to an embodiment. In this example, a payload target 300 comprises retroreflective square 303 and retroreflective square 305 set against a substantially non-reflective background 301. The substantially non-reflective background 301 may be, for example, dark felt material, matte black paint, or any similar surface that substantially does not reflect any light. In some embodiments, non-reflective background 301 may be the top of a payload or piece of cargo. In other embodiments, non-reflective background 301 may be set on the ground or otherwise displayed as an indicator of a location for a UAV to land or deposit a payload or piece of cargo.

Figure 4:
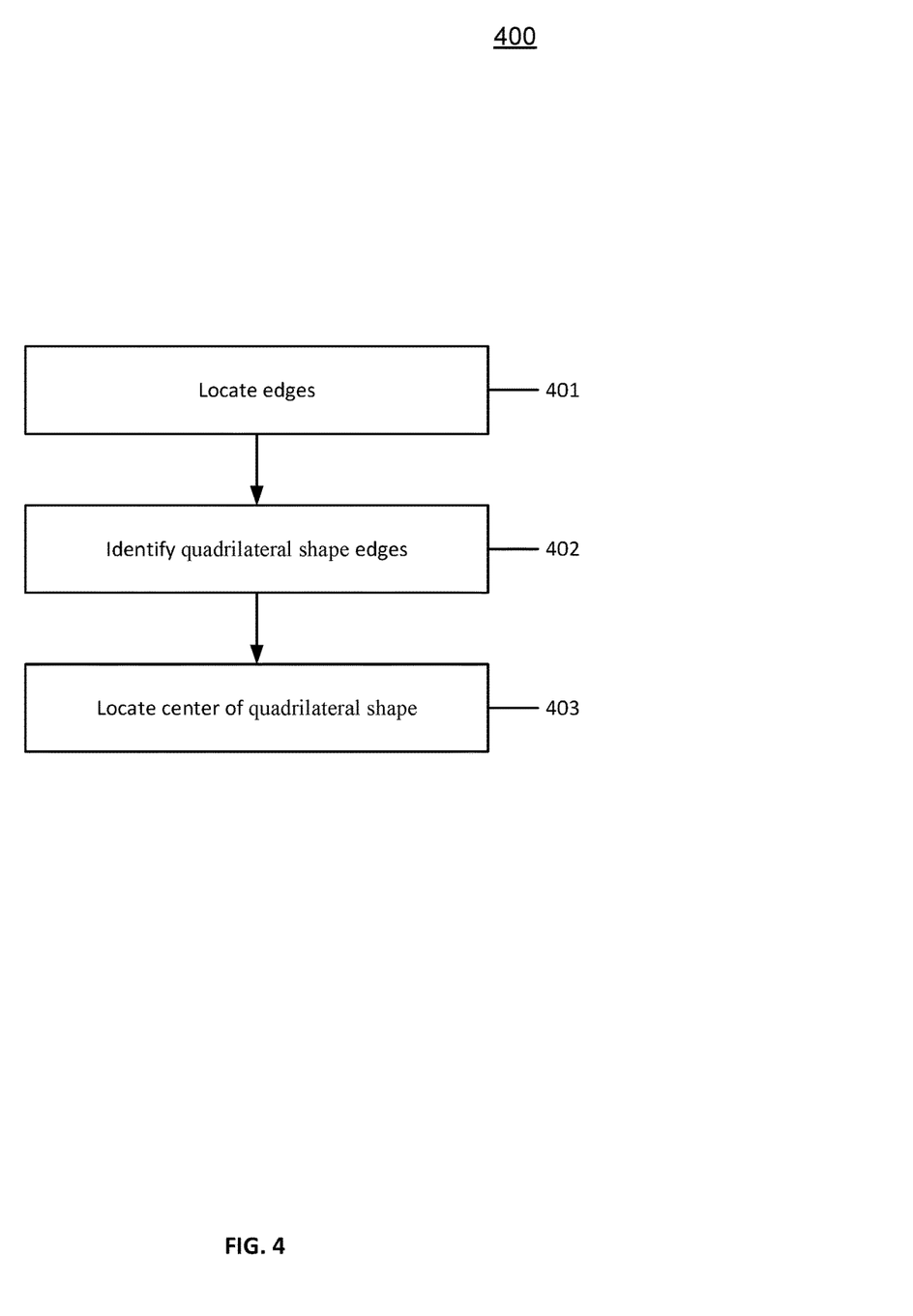
FIG. 4 illustrates a method of locating a payload target in an image according to an embodiment.

FIG. 4 illustrates a method 400 of locating a payload target in an image according to an embodiment. For example, method 400 may be used to locate a payload target such as payload target 300. The method for locating the payload target 300 thus includes locating squares because payload target 300 is comprised of concentric square or quadrilateral shapes.

At step 401, a targeting system first locates edges or contours in an image of a payload target. For example, the targeting system may locate edges 307, 309, and 311 of payload target 300, among others. Each inside and outside edge of each square 303, 305 is an edge that a targeting system may locate.

The method may locate any quadrilateral or square in the image, such that there is no preference between the various square edge shapes that may be visible in an image. However, in some embodiments, the edge-finding approach may start from the outside of the image and progress inwards such that the largest square in the image is most likely to be identified first. Once a first square is identified, the method may proceed because all squares of payload target 300 share a common center. That is, the center of any square of the payload target 300 will be the same as all other squares, so it is not necessary to locate more than one.

Next, at step 402, the targeting system identifies approximately four edges such as edge 307 and the other three edges that comprise the outer edge of square 303. In an example, the targeting system may only locate three out of four edges of a square due to an artifact obscuring the fourth edge. Similarly, the targeting system may locate the four edges of a square and an additional edge that does not correspond to the same square. The targeting system then estimates the lengths of the edges and the angles at which the edges are joined.

In an image without skew or distortion, the lengths of the edges of a square are equal and the angles at which the edges are joined are right angles. In an image of a square taken at an angle and with potential sources of distortion or other inaccuracy, the targeting system may use a tolerance threshold to find edges that are substantially equal in length and joined at vertices consisting of substantially right angles. For example, a tolerance threshold may be expressed as a percentage range such as +/−10% such that edges that are within 10% of the same length of other edges and joined at angles within 10% of a right angle are considered to be squares by the targeting system. In some embodiments, fuzzy detection logic may be used to determine if the aspect ratio of a square formed by the edges is within certain limits. In some embodiments, the targeting system may evaluate the shape formed by the edges to ensure that it is a convex polygon, that is that all of the quadrilateral shape's interior angles or vertices are less than 180°. These various approaches enable the targeting system to locate a square in less than ideal conditions such as may be encountered in a practical application.

At this step, the targeting system may perform some error checking on the identified edges. For example, if the size of the payload target is known, and the altitude of the UAV is known, then the targeting system may be able to identify an expected range of sizes of edges. An altitude of the UAV may be received from, for example, a range-finding system such as a LIDAR or SONAR system that measures a distance to ground from the UAV. Identified edges much larger or smaller than the expected range may be an indication of erroneous input or some other error. For example, if an image is taken at an altitude of 40 feet of a payload target of approximately two feet in diameter, the targeting system may determine an approximate pixel range of expected edge lengths that may correspond to the payload target based on properties of the camera and basic geometry. This type of error checking may reject false positives in a noisy image or environment. Edges that are detected as too large or too small by the error checking may be discarded. In some embodiments, a calculated area of the shape that the edges form may be compared against an expected range of areas given a known altitude of the UAV and a known payload target size.

Once the edges of a square have been identified, at step 403 a center of the identified quadrilateral shape or square is determined. Because square 303 and square 305 are concentric, the same center of the payload target 300 will be found whether the targeting system locates any of the squares present in an image of the payload target, including the outside edges of square 303, the inside edges of square 303, or the outside edges of square 305. While payload target 300 is illustrated as having two concentric squares, this property of the concentric squares may be applied to any number of concentric squares. For example, a payload target may have an additional square larger than 303 that will enable a targeting system to locate the same center of the payload target 300 as long as the centers of the larger square is coincident with the centers of squares 303 and 305.

Figure 5:
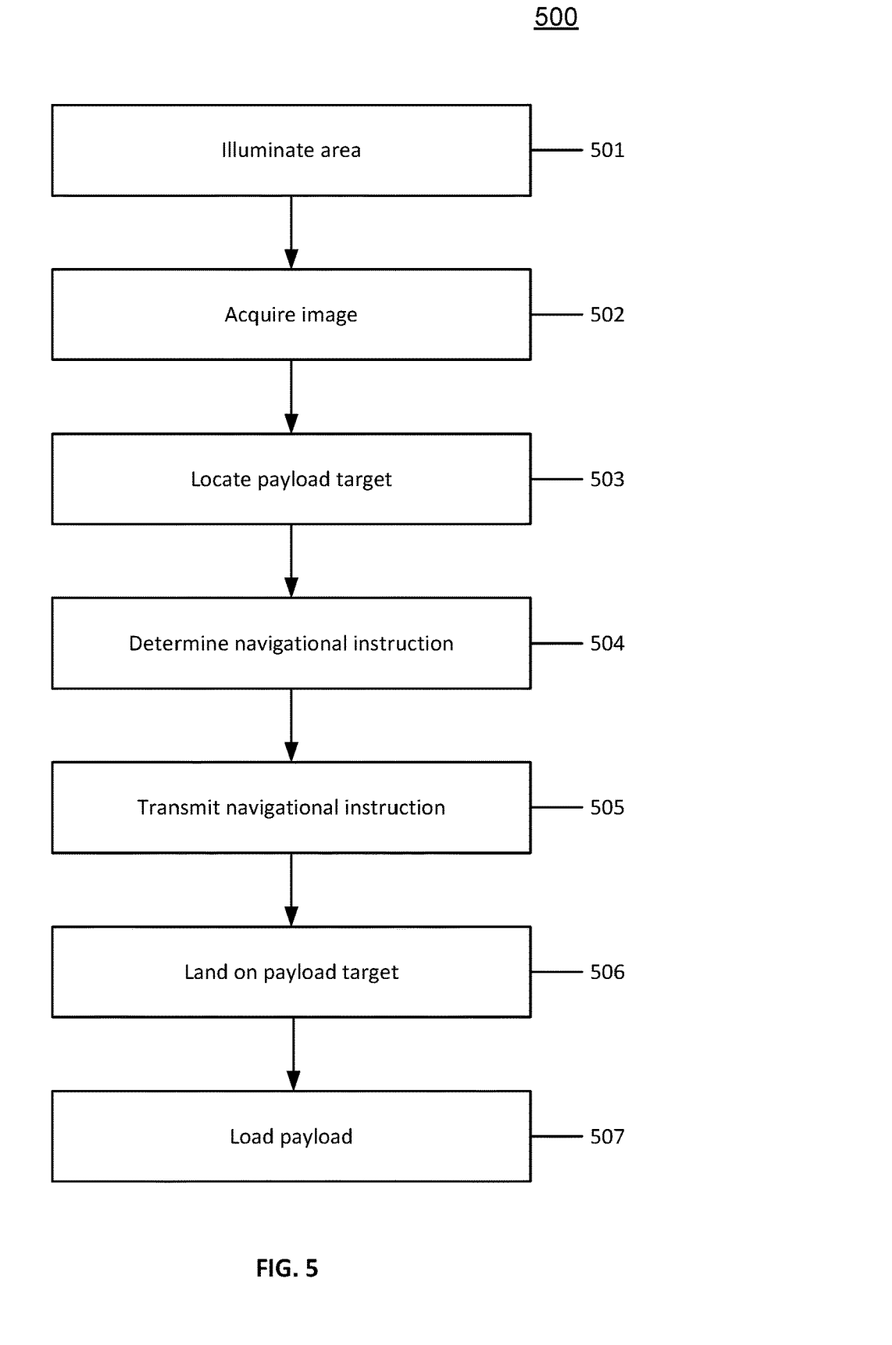
FIG. 5 illustrates a method of UAV navigation according to an embodiment.

FIG. 5 illustrates a method of UAV navigation according to an embodiment. At step 501, a UAV illuminates an area under the UAV with infrared light from an illumination system. At step 502, the UAV acquires an image of an area under the UAV with an infrared camera. The illumination system may be positioned and configured to illuminate the field of view of the infrared camera. The camera may have a filter to filter out light outside of an infrared band that corresponds to the known band emitted by the illumination system as installed. This combination may produce a high contrast image of a payload target if the infrared band is selected so that there is little other light in the same band in the environment around the payload target.

At step 503, the UAV locates a payload target in the acquired image. The payload target may be, for example, attached to a top side of a payload or piece of cargo that the UAV intends to pick up. In other examples, the payload target may designate a location at which the UAV is to land, or to deliver a payload. For example, a payload target may designate a location at which a UAV is to airdrop a payload from an altitude to land at the payload target. In another example, a payload target may designate a location at which a UAV is to land and release a payload on the ground such that the payload is not dropped but gently placed on the ground.

At step 504, a targeting system of the UAV determines a route to move the UAV to the payload target. A distance estimate to the payload target may be derived from the image, the altitude of the UAV, and properties of the camera used. For example, the targeting system may estimate a scale of pixel data in the image based on the altitude and the field of view of the camera using basic geometric relationships.

In some embodiments, the identified route may be an identification of a direction to move and an estimate of how far, and thus how fast, to move in that direction. For example, if the payload target is estimated to be very far away, the targeting system may determine to move at a high speed in the direction of the payload target. Conversely, if the payload target is estimated to be relatively close, slower course correction may be appropriate.

In some embodiments, the route may be determined in a horizontal plane independent of altitude. That is, the route may be limited to an X-Y plane while the Z-axis (i.e., altitude) is independently controlled by a separate process. These embodiments may first center the UAV over the payload target and then a separate process may decrease altitude until the UAV lands on the payload target. In some embodiments this horizontal movement and altitude adjustment may occur simultaneously.

At step 505, the route determined by a targeting system in step 504 is transmitted to a navigation system of the UAV to control the UAV to follow the route. That is, the navigation system responds to the instructions from the targeting system and manipulates the control surfaces of the UAV to move towards the payload target. In some embodiments, the navigation system may control the altitude of the UAV as described above.

In some embodiments, the UAV may then land on the payload target at step 506 and load the payload at step 507. For example, the UAV may gently land on the payload target, engage with a payload or piece of cargo underneath the payload target to grab it or otherwise acquire it, and then take off again with the payload.

Figure 6:
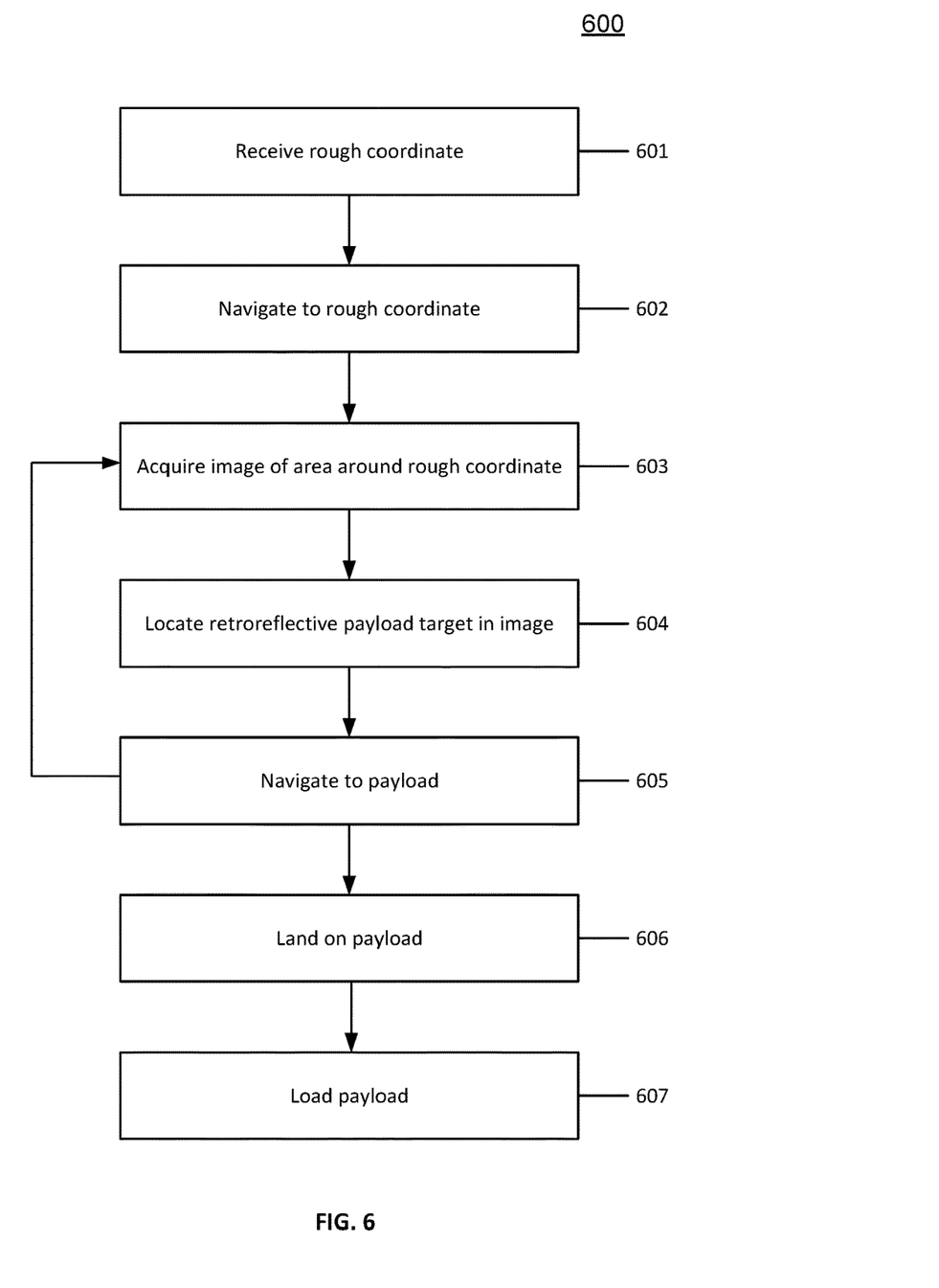
FIG. 6 illustrates a method of autonomous payload handling by an unmanned cargo aircraft according to an embodiment.

FIG. 6 illustrates a method of autonomous payload handling by an unmanned cargo aircraft according to an embodiment. At step 601, an unmanned cargo aircraft receives a rough coordinate of a payload to pick up and navigates to the rough coordinate at step 602 using a rough locating system. For example, the rough coordinate of a payload may be a Global Navigation Satellite System (GNSS) coordinate of the payload and the aircraft may then navigate to the GNSS coordinate using a GNSS locating system. The GNSS system may be, for example, any one of or a combination of Global Positioning System (GPS), GLONASS, Galileo, or BeiDou GNSS systems. In an example, the GPS coordinates of the payload and the aircraft may be considered rough because GPS may have an accuracy of approximately +/−16 feet. That is, the aircraft may get within 16 feet of the payload using just GPS navigation. However, an accuracy on par with GPS coordinates may not be sufficient to accurately and precisely land at a single point. Thus, once the aircraft arrives at the rough coordinate, it switches to a more precise navigation method to locate and land at the spot designated by a payload target.

At step 603, the aircraft begins an image-based navigation method by acquiring an image of an area around the rough coordinate. For example, in an embodiment, the aircraft navigates to the rough coordinates, and once at the rough coordinates, takes an image facing downwards of the ground beneath the rough coordinates. The field of view or focal length of the camera on the aircraft may be configured to capture an area sufficiently large to ensure the payload target is in the field of view at a predetermined altitude for a given rough coordinate accuracy. For example, if the rough coordinate accuracy is +/−16 feet, the field of view of the camera may be configured so that at a predetermined altitude the payload target will be in the field of view even in a worst case scenario where the aircraft is 16 feet away from the payload target. Furthermore, the predetermined altitude may be selected based on the resolution of the camera, the illumination power, and the size of the payload target. That is, the predetermined altitude may be selected so that a minimum resolution of the payload target is likely to be imaged by the camera given these parameters. In an example, the predetermined height may be approximately 40 feet. Then, if the aircraft navigates to the rough coordinates and sets its altitude to the predetermined height, the payload target is highly likely to be imaged by the camera.

At step 604, the payload target is located in the image, and at step 605 the aircraft navigates to the payload target based on the location of the payload target in a manner similar to step 504 of method 500 discussed above.

Steps 603-605 may be iteratively repeated as the aircraft moves closer to the payload target. A series of image frames may be acquired and analyzed to locate the payload target, and the course of the aircraft adjusted to progressively navigate to the payload target. As the aircraft approaches the target, it may be subject to small deviations due to wind or other factors that may be rapidly corrected for by running the image-based navigation steps 603-605 at a high frequency. In some embodiments, this image acquisition, analysis, and navigation sequence may be completed for each frame in real-time. That is, the refresh rate of the image-based navigation method may be equal to or higher than the refresh rate of the video camera being used. In some embodiments, the refresh rate of the camera may be 30 Hz, and the image-based navigation method may be capable of running at approximately 100 Hz, or complete in about 10 ms. This rate of execution allows the target to be located in each frame of video, and the course to the payload target corrected thirty times per second.

Once the aircraft has arrived at the payload target, it may then decrease its altitude over the target to gradually land on the payload target at step 606. In some embodiments, this decrease in altitude may occur simultaneously with the navigation in steps 603-605 such that the aircraft may approach the payload target at an angled approach. In some embodiments, the aircraft may first center over the payload target by way of steps 603-605 at a predetermined altitude, and then lower its altitude to land on the payload target.

Either way, once the aircraft has landed on the payload target at step 606, it may then load the payload onto the aircraft at step 607. In an embodiment, loading the payload onto the aircraft may be fully autonomous such that a latch system or other payload acquisition system of the aircraft automatically engages with the payload upon landing on it. Then, the aircraft may take off again with the payload loaded onto the aircraft, ready for delivery to its destination. While discussed in an example where a payload is picked up by the aircraft, a similar process may be used to drop off a payload at the same target location as well.

Figure 7:
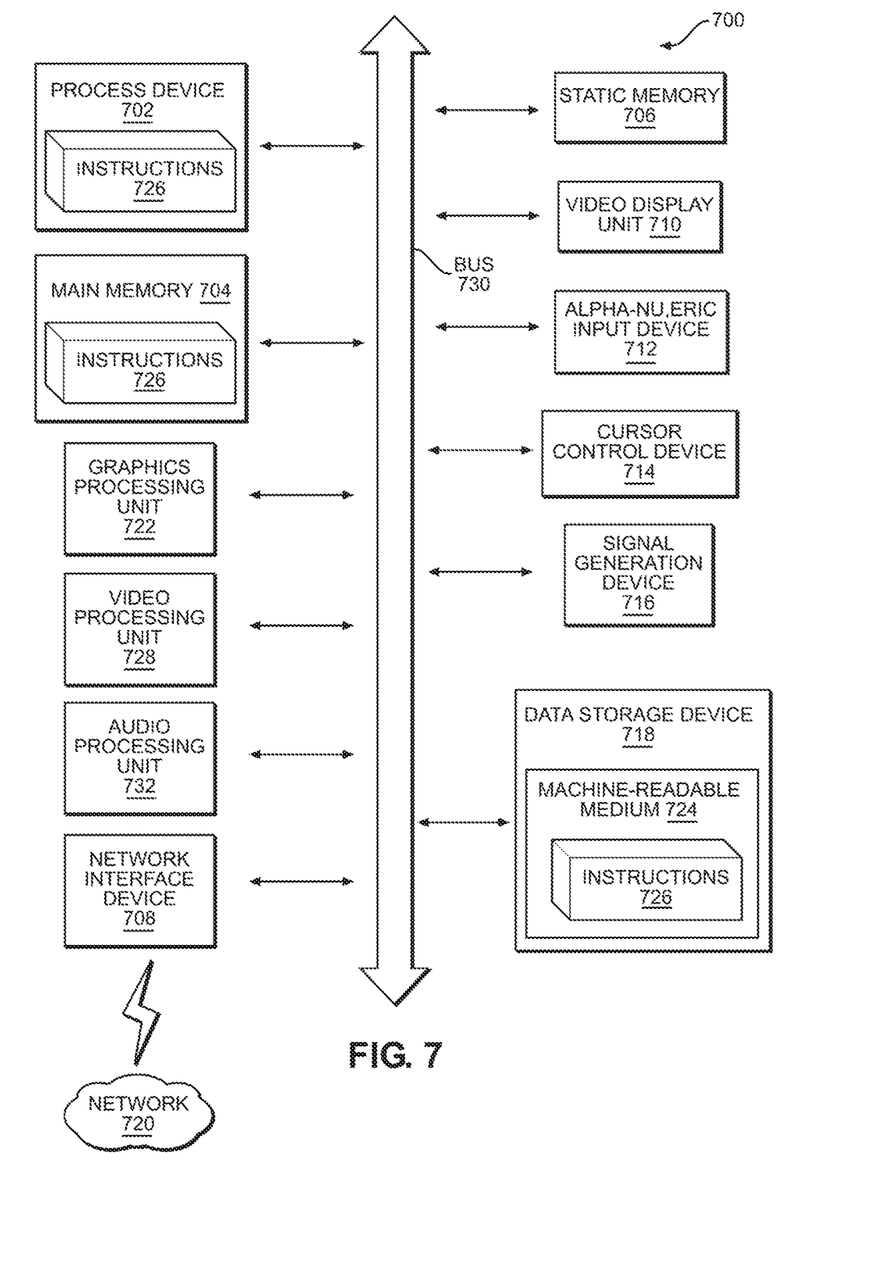
FIG. 7 illustrates an example machine of a computer system within which a set of instructions, for causing the machine to perform any one or more of the methodologies discussed herein, may be executed.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An unmanned aerial vehicle (UAV) navigation system, comprising:
    a camera attached to the UAV positioned to have a downward view;
    an illumination system attached to the UAV positioned to illuminate the view of the camera;
    a payload having a retroreflective payload target on its top side; and
    a targeting system configured to receive images from the camera, locate the payload target in the field of vision of the camera, and transmit navigational instructions to a navigation system,
    wherein the navigation system receives the navigational instructions and navigates the UAV to the payload;
    wherein the payload target is retroreflective;
    wherein the payload target comprises a plurality of concentric squares of retroreflective material;
    wherein to locate the payload target in the field of vision of the camera the targeting system is configured to:
        identify a plurality of edges in an image;
        identify a quadrilateral shape formed by four edges of the plurality of edges; and
        find the geometric center of the quadrilateral shape.

2. The system of claim 1, wherein the illumination system is an infrared illumination system that produces light in an infrared spectrum.

3. The system of claim 2, further comprising a filter fitted to the camera designed to block light outside of the infrared spectrum.

4. The system of claim 1, further comprising a payload latch system configured to latch onto the payload when the UAV lands on the payload.

5. The system of claim 1, wherein the camera is a video camera capturing successive frames of video at a fixed framerate, and the targeting system locates the payload target in each video frame in real-time as they are captured.

6. The system of claim 1, wherein the retro-reflective payload target comprises a plurality of concentric squares of retro-reflective material on a substantially non-reflective background.

7. The system of claim 6, wherein the targeting system locates the payload target by locating squares in the image.

8. A method of unmanned aerial vehicle (UAV) navigation, comprising:
    illuminating an area under a UAV with infrared light;
    acquiring an image of the area under the UAV with an infrared camera;
    locating a payload target in the image, wherein the payload target is attached to a payload;
    determining a navigation instruction to navigate the UAV to the payload target; and
    transmitting the navigation instruction to a navigation system of the UAV, wherein the navigation system receives the navigation instructions and navigates the UAV to the payload target;
    wherein the payload target is retroreflective;
    wherein the payload target comprises a plurality of concentric squares of retroreflective material;
    wherein locating the payload target in the image comprises:
        identifying a plurality of edges in the image;
        identifying a quadrilateral shape formed by four edges of the plurality of edges;
        determining that the vertices of the quadrilateral shape are all substantially right angles;
        finding the geometric center of the quadrilateral shape.

9. The method of claim 8, wherein the navigation instruction includes an estimated distance from the UAV to the payload target and a direction to the payload target.

10. The method of claim 9, wherein the navigation system navigates the UAV to the payload target by closing the distance from the UAV to the payload target while decreasing the altitude of the UAV.

11. The method of claim 8, further comprising:
    landing the UAV on the payload target; and
    loading the payload onto the UAV.

12. A method of autonomous payload handling by an unmanned cargo aircraft, comprising:
    receiving a rough coordinate of a payload, the payload having a retroreflective payload target on a top side, the payload target comprising a plurality of concentric squares of retroreflective material;
    navigating the aircraft to the rough coordinate;
    acquiring, using a camera, an image of an area around the rough coordinate;
    locating the retroreflective payload target in the image, including:
        identifying a plurality of edges in the image;
        identifying a quadrilateral shape formed by four edges of the plurality of edges; and
        finding the geometric center of the quadrilateral shape;
    navigating the aircraft to the payload based on the location of the retroreflective payload target;
    landing the aircraft on the payload; and
    loading the payload onto the aircraft.

13. The method of claim 12, wherein the rough coordinate is a global navigation satellite system coordinate.

14. The method of claim 12, wherein the navigating the aircraft to the payload includes:
    capturing a plurality of images at a first framerate;
    locating the retroreflective payload target in each of the plurality of images; and
    generating navigational instructions to move the aircraft to the retroreflective payload target.

15. The method of claim 12, wherein the loading the payload onto the aircraft includes:
    engaging a portion of the payload with a payload latch attached to the aircraft.

16. The method of claim 12, wherein the camera is an infrared camera.

* * * * *